US012559046B2

(12) United States Patent
Bieniek et al.

(10) Patent No.: US 12,559,046 B2
(45) Date of Patent: Feb. 24, 2026

(54) METHOD FOR PRODUCING A DECORATIVE PART AND DECORATIVE PART PRODUCIBLE BY THIS METHOD

(71) Applicant: JOYSONQUIN Automotive Systems GmbH, Rutesheim (DE)

(72) Inventors: Klaus Bieniek, Muhlacker (DE); Muamet Sadiku, Stuttgart (DE)

(73) Assignee: JOYSONQUIN Automotive Systems GmbH, Rutesheim (DE)

( * ) Notice: Subject to any disclaimer, the term of this patent is extended or adjusted under 35 U.S.C. 154(b) by 1121 days.

(21) Appl. No.: 17/345,079

(22) Filed: Jun. 11, 2021

(65) Prior Publication Data

US 2021/0387581 A1 Dec. 16, 2021

(30) Foreign Application Priority Data

Jun. 15, 2020 (DE) .......................... 102020207380.5

(51) Int. Cl.
| | |
|---|---|
| *B60R 13/02* | (2006.01) |
| *B29C 65/70* | (2006.01) |
| *B32B 27/08* | (2006.01) |

(52) U.S. Cl.
CPC .............. *B60R 13/02* (2013.01); *B32B 27/08* (2013.01); *B05D 2518/10* (2013.01); *B29C 65/70* (2013.01); *B32B 2255/26* (2013.01); *B32B 2305/72* (2013.01); *B32B 2605/003* (2013.01)

(58) Field of Classification Search
CPC .. B05D 2518/10; B05D 2518/20; B29C 65/70
See application file for complete search history.

(56) References Cited

U.S. PATENT DOCUMENTS

| | | | | |
|---|---|---|---|---|
| 6,887,413 | B1 | 5/2005 | Schumacher ................. | 264/135 |
| 2002/0150765 | A1 | 10/2002 | Chang et al. ............ | B32B 9/04 |
| 2004/0131793 | A1 | 7/2004 | Bier et al. ................ | B05D 3/08 |
| 2007/0116968 | A1* | 5/2007 | Dierdorf .............. | C09D 183/16 |
| | | | | 528/38 |
| 2008/0131706 | A1 | 6/2008 | Brand et al. .................. | 428/450 |
| 2008/0138611 | A1 | 6/2008 | Yasuzawa et al. ............ | 428/336 |
| 2008/0234163 | A1 | 9/2008 | Shimizu et al. .............. | 510/175 |

| | | | | |
|---|---|---|---|---|
| 2012/0009400 | A1* | 1/2012 | Nauer ................... | B32B 27/302 |
| | | | | 428/428 |
| 2013/0266781 | A1 | 10/2013 | Hoffmann et al. ..... | C03C 17/42 |
| 2015/0252222 | A1 | 9/2015 | Ozaki et al. ......... | C09D 183/16 |
| 2016/0214345 | A1 | 7/2016 | Kataoka et al. .......... | B32B 3/30 |
| 2016/0333187 | A1* | 11/2016 | Bauer ................. | C09D 201/00 |
| 2017/0165884 | A1 | 6/2017 | Benyahia et al. .. | B29C 45/0688 |
| 2019/0084285 | A1 | 3/2019 | Weissenberger ...... | B32B 37/025 |
| 2019/0224941 | A1 | 7/2019 | Shibahara et al. ........ | B32B 3/30 |

FOREIGN PATENT DOCUMENTS

| | | |
|---|---|---|
| CN | 1608314 | 4/2005 |
| CN | 1861713 | 11/2006 |
| CN | 101080282 | 11/2007 |
| CN | 103003217 | 3/2013 |
| CN | 104718030 | 6/2015 |
| CN | 104903409 | 9/2015 |
| CN | 105593015 | 5/2016 |
| CN | 107735256 | 2/2018 |
| CN | 108329505 | 7/2018 |
| CN | 109562599 | 4/2019 |
| DE | 19914092 | 10/1999 |
| DE | 10245726 | 4/2004 |
| DE | 102005008857 | 9/2006 |
| DE | 102009008868 | 9/2010 |
| DE | 102009053501 | 1/2011 |
| EP | 2298528 | 3/2011 |
| EP | 3275689 | 11/2020 |
| JP | 2020049886 | 4/2020 |
| WO | 2842742 | 3/2015 |
| WO | WO 2016008790 | 1/2016 |

OTHER PUBLICATIONS

Chinese Examination Report dated Feb. 14, 2022 in counterpart Chinese application No. 202110660892.8; 8 pages.
German Notification dated May 3, 2021 in corresponding German application 10 2020 207 308.5; 5 pages; with English translation, 3 pages.

* cited by examiner

*Primary Examiner* — James M Mellott

(74) *Attorney, Agent, or Firm* — Fattibene and Fattibene, LLC; Paul A. Fattibene

(57) ABSTRACT

A method for producing a decorative part which comprises a visible side with a decorative layer and a mounting side with a substrate layer, wherein a polysilazane-containing composition is applied to the visible side of the decorative layer to form a cover layer and is subsequently cured. Also, a decorative part producible by the method.

15 Claims, No Drawings

1

METHOD FOR PRODUCING A DECORATIVE PART AND DECORATIVE PART PRODUCIBLE BY THIS METHOD

FIELD OF THE INVENTION

The invention relates to a method for producing a decorative part, in particular a decorative part for a vehicle interior, which comprises a visible side with a decorative layer and a mounting side with a substrate layer, and to a decorative part which can be produced by this method.

BACKGROUND OF THE INVENTION

Decorative parts, as used particularly in the interiors of motor vehicles, must meet high requirements in terms of their visual and haptic quality as well as dimensional accuracy and resistance to environmental influences. For this purpose, a design is widely used in which a decorative layer, which determines the visual appearance, is provided with a protective transparent cover layer on the visible side of the decorative part. On the opposite mounting side, a substrate or substrate layer is provided which gives the decorative part the necessary dimensional stability and is provided for fastening the decorative part.

A transparent cover layer with high surface quality can be produced, for example, from polyester or polyurethane thick-film coating. However, the coating requires numerous manual finishing operations, which is work and cost-intensive. In addition, the clear coating tends to yellow under the influence of light and temperature, which deteriorates the visual appearance of the decorative part over time. Shrinkage processes can cause the non-smooth surface of a textured decorative layer to gradually form an undesirable image on the surface of the transparent cover layer.

In order to avoid the above-mentioned disadvantages, decorative components and corresponding manufacturing processes have become known in which the transparent cover layer is injected in the form of a transparent plastic onto the decorative layer in an injection mold. The amount of reworking required is reduced here. With suitable material selection, the quality of the visible surface side is maintained over a longer period because the injection-molded plastic material is less sensitive to external influences.

A further development of this method is disclosed in EP 2 298 528 A1. Here, the decorative layer is laminated with a transparent film on its side facing the visible side and with a barrier layer on its side facing the mounting side. The laminated decorative layer is formed into a preform which is then overmolded with a transparent plastic to form the cover layer and back injection molded with a load-bearing plastic to form the substrate. A decorative part is formed in which a transparent film is arranged between the cover layer and the decorative layer and in which a barrier layer is arranged between the substrate and the decorative layer. The transparent film is made, for example, of a thermoplastic, in particular polycarbonate (PC), polymethyl methacrylate (PMMA), polyvinyl butyral (PVB), thermoplastic polyurethane (TPU), or a composite of these materials. The cover layer is made of an injection moldable plastic, in particular polymethyl methacrylate (PMMA).

Another example of a decorative part is disclosed in EP 2 842 742 A1. The decorative part disclosed therein comprises a cover layer applied directly to a substrate, wherein the cover layer consists of polyurethane or polyurea and the substrate consists of a mixture of at least one thermoplastic and at least one urethane-based thermoplastic elastomer.

Another example of a decorative part is disclosed in DE 199 14 092 A1. The decorative part disclosed therein comprises a decorative layer and an injection-molded substrate layer connected thereto.

SUMMARY OF THE INVENTION

The present invention is based on the problem of providing a new decorative part for a vehicle interior and a method for producing this decorative part. The decorative part is intended to exhibit high mechanical resistance, in particular high scratch resistance and abrasion resistance. In addition, the decorative part is intended to be permanently resistant to external influences, such as mechanical impact or UV radiation, and further to allow the use of inherently sensitive decorative layers.

This problem is solved by a method for producing a decorative part which comprises a visible side with a decorative layer and a mounting side with a substrate layer, wherein a polysilazane-containing composition is applied to the visible side of the decorative layer to form a cover layer and is subsequently cured. Furthermore, the problem is solved by a decorative part which can be obtained in particular by this method and comprises a visible side with a decorative layer and a mounting side with a substrate layer, wherein the decorative layer is coated on the visible side with a cured polysilazane-containing cover layer.

Due to the use of a polysilazane-containing cover layer, excellent scratch and abrasion resistance is achieved. At the same time, the cover layer also effectively protects sensitive decorative layers against external influences without impairing the appearance of the decorative layer. In particular, the cover layer has dirt-repellent properties and is easy to clean. At the same time, the cover layer is resistant to common cleaning agents.

DETAILED DESCRIPTION OF THE PREFERRED EMBODIMENTS

The decorative part described here includes a substrate layer and a decorative layer applied to the substrate layer. This structure defines the visible side and the mounting side of the decorative part. The visible side is the side on which the decorative surface of the decorative layer is visible. The mounting side is the side opposite the visible side on which the usually planar substrate layer is applied.

The decorative layer can be formed, for example, by wood veneer, metal, paper or a fabric. Preferably, the wood veneer is a real wood veneer, preferably a precious wood veneer. The wood veneer can be joined to an additional blind veneer on the mounting side, wherein the decorative wood veneer and the blind veneer are joined, for example, by means of a fleece impregnated with phenolmelamine resin or a layer of glue. Insofar as the decorative layer is made of a metal, aluminum, steel and copper are particularly suitable for this purpose. The metal is preferably designed as a thin sheet. The fabric used can be a textile fabric made of natural or synthetic fibers, glass, carbon, Kevlar fabric, metal or metallized fabric, or a mixed fabric made of several of the above-mentioned fabrics, which can be tightly or widely meshed and thus make the layer behind it visible, for example the substrate layer behind the decorative layer.

The thickness of the decorative layer is preferably in the range of 0.1 mm to and including 2 mm, particularly preferably 0.3 mm to 0.7 mm.

The decorative layer preferably has a hydrophilic surface in order to improve adhesion between the decorative layer and the other layers directly joined to the decorative layer. In addition, the decorative layer preferably has an open-pored surface in order to achieve a larger contact surface between the decorative layer and the other layers directly joined to the decorative layer.

The cover layer according to the invention is produced by applying and curing a polysilazane-containing composition to the visible side of the decorative layer. The cover layer can be applied directly to the decorative layer, or one or more intermediate layers can be provided between the cover layer and the visible side of the decorative layer.

In a preferred embodiment, one or more intermediate layers are provided between the cover layer and the decorative layer. Preferably, at least one intermediate layer made of a thermoplastic or thermosetting plastic is used. For example, a polymethyl methacrylate-containing composition is used as the thermoplastic, and a polyurethane-containing composition is used as the thermosetting plastic. The use of a polymethyl methacrylate-containing intermediate layer is particularly preferred. The intermediate layers are at least partially translucent to ensure the visibility of the decorative layer. The intermediate layers can be colorless or colored.

The intermediate layers are applied to the visible side of the decorative layer before the cover layer is applied. In a subsequent step, the cover layer is applied to the top intermediate layer.

In an alternative embodiment, the cover layer is applied directly to the visible side of the decorative layer. In this case, the decorative layer preferably has an open-pored surface. Particularly preferably, the cover layer is applied directly to the decorative layer, if the decorative layer has a surface made of metal or a plastic film.

The polysilazane used may be a perhydropolysilazane (inorganic polysilazane), an organopolysilazane (organic polysilazane) or a mixture of different polysilazanes. Particularly preferably, at least one organopolysilazane is used.

Suitable polysilazanes are commercially available under the trademark Durazane, for example. Inorganic polysilazanes are available under the Durazane 2000 product range, organic polysilazanes under the Durazane 1000 product range. Methyl- and/or methylvinyl-modified organopolysilazanes in particular are used as organic polysilazanes.

Perhydropolysilazanes in particular form a carbon-free, glassy silicon oxide network during curing, which has excellent surface properties. Due to the lower mechanical flexibility of the resulting cover layer, perhydropolysilazane-containing compositions are preferably applied after the decorative layer has been formed into a preform.

Preferably, the polysilazane has a number average molecular weight of 150 g/mol to 150,000 g/mol, more preferably 1,000 g/mol to 100,000 g/mol, most preferably 2,000 g/mol to 20,000 g/mol.

The polysilazane-containing composition usually comprises, in addition to the polysilazane, one or more solvents, in particular organic solvents, such as xylene, ethylbenzene, di-n-butyl ether, n- and/or tert-butyl acetate. The proportion of polysilazane in the composition is preferably from 20 wt. % to 100 wt. %, more preferably from 20 wt. % to 80 wt. %, most preferably from 50 wt. % to 80 wt. %. The proportion of polysilazane is selected such that the preferably liquid composition has a viscosity suitable for application to the decorative layer. If necessary, the viscosity can be adjusted by diluting a commercially available polysilazane composition with a suitable solvent, in particular an organic solvent. The proportion of polysilazane varies in particular depending on the method of application. If the cover layer is applied by spray application, the polysilazane content is, for example, 20 wt. % to 80 wt. %, particularly preferably 40 wt. % to 60 wt. %. In case of a jet application, the polysilazane content is, for example, 60 wt. % to 100 wt. %, particularly preferably 70 wt. % to 90 wt. %.

Before applying the polysilazane-containing composition and any intermediate layers, the decorative layer is preferably cleaned. This is done, for example, by a gas stream, such as compressed air. In a preferred embodiment, cleaning is carried out by dry ice blasting, i.e. by irradiating the surface with a mixture of dry ice particles ($CO_2$ particles) and compressed air. In addition to compressed air, another inert carrier gas can also be used for this purpose. This cleaning removes microparticles from the surface of the decorative layer and enables uniform application of the cover layer and any intermediate layers.

The polysilazane-containing composition is preferably applied in liquid form. This can be done, for example, by dipping, spraying, flooding or casting. In the case of dipping, the decorative part is passed through a bath of the polysilazane-containing composition. In the case of flooding and casting, the surface of the decorative part is flooded with the polysilazane-containing composition, which can be applied by means of one or more nozzles, in particular flooding or rinsing nozzles. The application can be carried out, for example, in a continuous flow or lowering process.

In a particularly preferred embodiment, the polysilazane-containing composition is applied by spraying. In this way, an extremely uniform coating is achieved while at the same time keeping material consumption low. Particularly preferably, the spraying process is carried out by jet spray application without paint mist.

In order to avoid a premature reaction of the polysilazane, the application is preferably carried out under inert gas, for example in a nitrogen atmosphere. This applies in particular to application by spraying.

Particularly good results are achieved if the application is carried out at a temperature of 10° C. to 40° C. and a relative humidity of 30% or more. Preferably, the temperature is 20° C. to 30° C. The relative humidity is preferably 30% to 80%, particularly preferably 40% to 70%. Under these conditions, excellent adhesion of the cover layer is achieved.

The applied polysilazane-containing composition is then cured to form the cover layer. During curing, the polysilazane reacts with water with hydrolysis of the Si—N bonds and subsequent condensation to form Si—O—Si units. Curing is preferably carried out at a temperature of 50° C. to 100° C. and a relative humidity of 10% to 80%. Particularly preferably, the temperature is 60° C. to 90° C., most preferably 75° C. to 85° C. The relative humidity is preferably 40% to 80%. The duration of curing is preferably 10 minutes to 180 minutes, most preferably 60 minutes to 120 minutes. Under these conditions, the polysilazane-containing cover layer obtains excellent dirt-repellent properties with simultaneous high transparency and mechanical stability.

The cured cover layer preferably has a thickness of 0.25 μm to 25 μm, more preferably 6 μm to 10 μm.

The intermediate layers, if provided, can also be applied to the decorative layer by the methods described above or by other coating methods known from the prior art.

The substrate layer is preferably formed from plastic, in particular thermosetting or thermoplastic plastic. Suitable materials for the substrate layer include urethane (TPU), polycarbonate (PC), acrylonitrile-butadiene-styrene (ABS), polyamide (PA), polypropylene (PP), styrene-acrylonitrile (SAN), styrene-maleic anhydride (SMA), polypropylene ether (PPE), polyphenylene oxide (PPO), or a mixture of several of these plastics. For example, blends of PC and ABS, blends of ABS and PA, or blends of PC and SAN are particularly suitable. Particularly preferably, the substrate layer comprises a blend of TPU with one or more other plastics, in particular one or more of the above-mentioned plastics.

The plastic of the substrate layer can include further additives. For example, the plastic may be reinforced with glass, carbon or natural fibers. Preferably, the plastic is a glass fiber-reinforced plastic. Furthermore, fillers, such as silica or carbon black, may be included.

To produce the decorative part, the decorative layer is preferably formed into a preform. The shape of this preform essentially corresponds to that of the subsequent decorative part. The preform is produced in a suitable press mold. Before, during or after this forming, the decorative layer can be joined to the substrate layer. The cover layer can also be applied and cured before or after forming.

The decorative layer and substrate layer are joined by known methods, in particular by pressing or injection molding method. For example, the decorative layer can be pressed onto the substrate layer, with SMC (Sheet Molding Compound) or GMT (Glass-Mat-reinforced Thermoplastic) in particular being used as the pressing method. Alternatively, the substrate layer can also be injection molded onto the decorative layer. The decorative and substrate layer can be joined before or after application and curing of the cover layer.

In the case of an injection molding method, the decorative layer is preferably formed into a preform, the shape of which essentially corresponds to the later decorative part, before being joined to the substrate layer. The substrate layer can then be injected onto the preform, wherein the preform serves as a die that dictates the final shape of the decorative part.

In the case of a pressing process, forming the decorative layer and joining it to the substrate layer can be carried out in a single step. For this purpose, the decorative layer and substrate layer are prepared in a flat, planar form and pressed together. Alternatively, the decorative layer can also be formed into a preform before being joined to the substrate layer. In this case, the substrate layer is also preferably formed into a corresponding preform before joining in order to enable the decorative layer and substrate layer to be pressed together.

In order to increase the adhesion between the decorative layer and the substrate layer, an adhesion promoter is preferably applied to the mounting side of the decorative layer before it is joined to the substrate layer. The adhesion promoter is, for example, glue or a reactive hotmelt adhesive. This is particularly the case with a decorative layer made of metal. If the decorative layer is a wood veneer with a blind veneer on the mounting side, a fleece impregnated with phenol-melamine resin or glue can also be placed on the mounting side of the decorative layer.

In one embodiment, the cover layer and any intermediate layers are applied to an initially flat decorative layer and cured, the resulting composite of cover, intermediate and decorative layers is then formed into a preform, and the preform is finally joined to the substrate layer.

However, it is preferable not to apply the cover layer and any intermediate layers before forming the decorative layer, but only on the already preformed decorative layer, in order to avoid damage to the cover layer during forming.

In a preferred embodiment, therefore, the decorative layer is first formed into a preform, the preform is then joined to the substrate layer, one or more intermediate layers are subsequently applied to the decorative layer if necessary, and finally the cover layer is applied to the decorative layer and cured.

In another preferred embodiment, the decorative layer is first formed into a preform, then any intermediate layers and the cover layer are applied to the decorative layer and cured, and finally the resulting preformed composite of cover, intermediate and decorative layers is joined to the substrate layer.

The method according to the invention is illustrated by the following example.

A preform comprising a decorative layer of a wood veneer and a substrate layer of a glass-fiber-reinforced polycarbonate/acrylonitrile-butadiene-styrene plastic joined thereto is tempered to a temperature of 23° C.

An intermediate layer of polyethyl methacrylate is applied to the visible side of the decorative layer by injection molding.

The visible side of the decorative layer is cleaned beforehand by dry ice blasting.

At an air temperature of 22° C. and a relative humidity of 60%, a polysilazane-containing composition is applied by spray application. The composition comprises an organic polysilazane in a sprayable dilution of 40% solids. The spray application is carried out using the following process parameters: Atomizing air 140 NL, horn air 160 NL, application speed of 500 mm/sec and application rate of 130 ml/min.

Subsequently, the polysilazane-containing composition is cured at a temperature of 60° C. and a relative humidity of 50% for 90 minutes.

The cover layer thus obtained exhibits very high mechanical resistance, in particular high scratch and abrasion resistance, and excellent transparency.

What is claimed is:

1. A method for producing a shaped decorative part installed within a vehicle interior comprising the steps of:
   forming a substrate having a vehicle interior mounting side and a decorative attachment side, the vehicle interior mounting side configured to be fastened to the vehicle interior;
   forming a decorative layer into a preform forming the shape of the decorative part, the decorative layer having a decorative layer visible side comprising a wood veneer, a metal, a paper, or a fabric and a substrate attachment side;
   joining the substrate attachment side of the decorative layer to the decorative attachment side of the substrate;
   applying a liquid polysilazane-containing composition to the decorative layer visible side of the decorative layer;
   curing the liquid polysilazane-containing composition on the decorative layer visible side of the decorative layer forming a cover layer on the decorative layer visible side of the decorative layer; and
   fastening the vehicle interior mounting side of the substrate to the vehicle interior, wherein the shaped decorative part is installed with the decorative layer visible side visible from within the vehicle interior.

2. Method according to claim 1, wherein the liquid polysilazane-containing composition includes a perhydropolysilazane or an organopolysilazane or a mixture thereof.

3. Method according to claim 1, wherein an amount of polysilazane in the liquid polysilazane-containing composition ranges from 0.1 wt. % to 50 wt. %.

4. Method according to claim 1, wherein the liquid polysilazane-containing composition is applied at a temperature of from 10° C. to 40° C. and a relative humidity of more than 30%.

5. Method according to claim 1, wherein the liquid polysilazane-containing composition is cured at a temperature of from 10° C. to 40° C. and a relative humidity of from 40% to 70%.

6. Method according to claim 1, wherein the cover layer has a layer thickness of 0.25 µm to 25 µm.

7. Method according to claim 1, wherein the decorative layer is cleaned with a gas stream or by dry ice blasting prior to application of the liquid polysilazane-containing composition.

8. Method according to claim 1, wherein the decorative layer is joined to the substrate layer before or after application and curing of the liquid polysilazane-containing composition forming the cover layer.

9. Method according to claim 1, wherein the substrate is a plastic layer joined to the decorative layer by a pressing method or an injection molding method.

10. Method according to claim 9, wherein:
the decorative layer has a thickness in the range of 0.3 mm to 0.7 mm.

11. Method according to claim 1, wherein at least one intermediate layer of a thermoplastic or thermosetting plastic is applied to the decorative layer before the liquid polysilazane-containing composition forming the cover layer is applied.

12. Method according to claim 1, wherein:
the polysilazane-containing composition is applied directly to the decorative layer visible side.

13. Method according to claim 1, wherein:
application of the liquid polysilazane-containing composition to the decorative visible side is carried out under inert gas,
whereby premature reaction of the liquid polysilazane-containing composition is avoided prior to the subsequent curing.

14. Method for producing a shaped decorative part according to claim 1, wherein:
the decorative layer has a thickness in the range of 0.3 mm to 0.7 mm.

15. Method for producing a shaped decorative part according to claim 14, wherein:
the substrate is a plastic layer joined to the decorative layer by a pressing method or an injection molding method.

* * * * *